Figure 5:
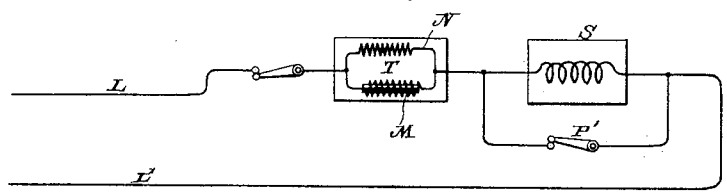

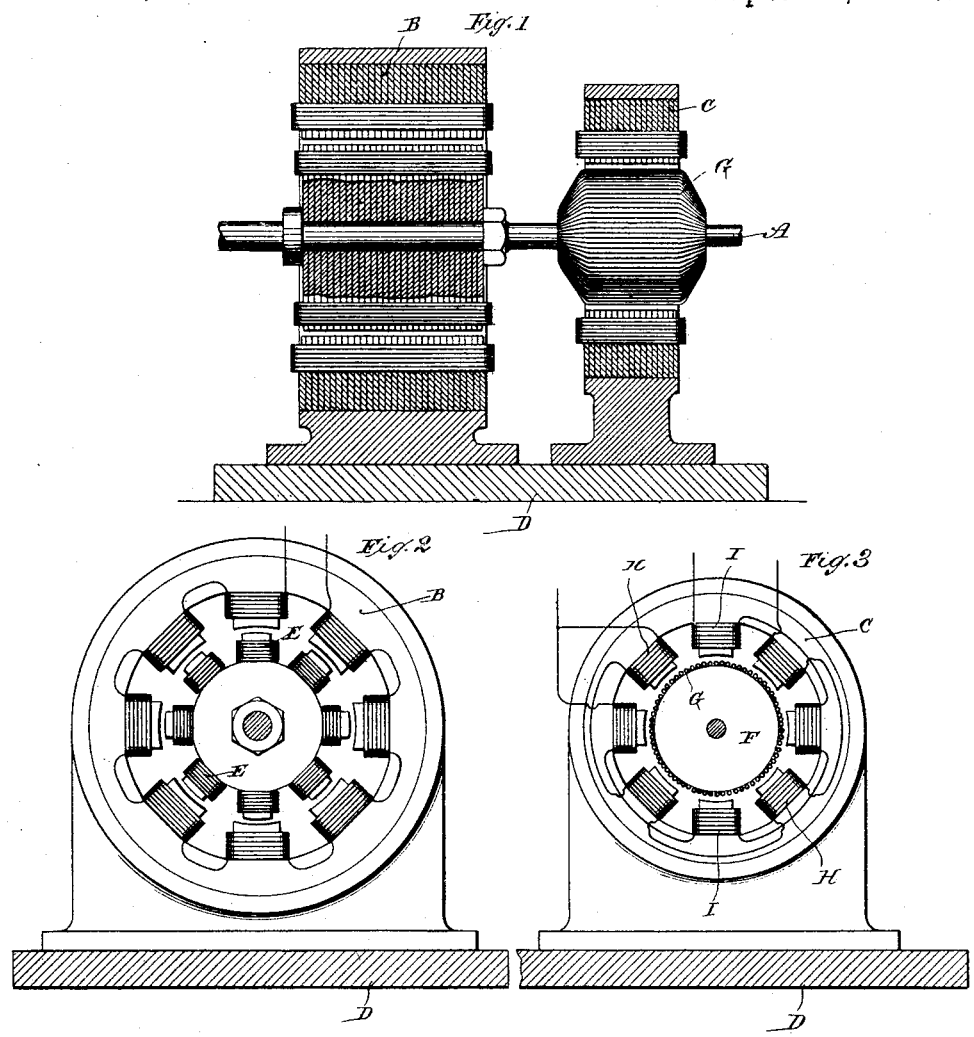

(No Model.)  2 Sheets—Sheet 2.

N. TESLA.
ELECTRO MAGNETIC MOTOR.

No. 459,772.  Patented Sept. 22, 1891.

Witnesses:
Raphael Netter
Robt. F. Gaylord

Inventor
Nikola Tesla
by
Duncan, Curtis & Page.
Attorneys.

UNITED STATES PATENT OFFICE.

NIKOLA TESLA, OF NEW YORK, N. Y., ASSIGNOR TO THE TESLA ELECTRIC COMPANY, OF SAME PLACE.

ELECTRO-MAGNETIC MOTOR.

SPECIFICATION forming part of Letters Patent No. 459,772, dated September 22, 1891.

Application filed April 6, 1889. Serial No. 306,165. (No model.)

*To all whom it may concern:*

Be it known that I, NIKOLA TESLA, a subject of the Emperor of Austria, from Smiljan, Lika, border country of Austria-Hungary, residing at New York, in the county and State of New York, have invented certain new and useful Improvements in Electro-Magnetic Motors, of which the following is a specification, reference being had to the drawings accompanying and forming a part of the same.

As is well known, certain forms of alternating-current machines have the property, when connected in circuit with an alternating-current generator, of running as a motor in synchronism therewith; but while the alternating current will run the motor after it has attained a rate of speed synchronous with that of the generator it will not start it. Hence in all instances heretofore when these "synchronizing motors," as they are termed, have been run, some means have been adopted to bring the motors up to synchronism with the generator, or approximately so, before the alternating current of the generator is applied to drive them.

In an application filed February 18, 1889, Serial No. 300,220, I have shown and described an improved system of operating this class of motors, which consists, broadly, in winding or arranging the motor in such manner that by means of suitable switches it could be started as a multiple-circuit motor, or one operating by a progression of its magnetic poles, and then, when up to speed, or nearly so, converted into an ordinary synchronizing motor, or one in which the magnetic poles were simply alternated. In some cases, as when a large motor is used and when the number of alternations is very high, there is more or less difficulty in bringing the motor to speed as a double or multiple-circuit motor, for the plan of construction which renders the motor best adapted to run as a synchronizing motor impairs its efficiency as a torque or double-circuit motor under the assumed conditions on the start. This will be readily understood, for in a large synchronizing motor the length of the magnetic circuit of the polar projections and their mass are so great that apparently considerable time is required for magnetization and demagnetization. Hence with a current of a very high number of alternations the motor may not respond properly. To avoid this objection and to start up a synchronizing motor in which these conditions obtain is the object of my present invention. I have therefore combined two motors, one a synchronizing motor, the other a multiple-circuit or torque motor, and by the latter I bring the first named up to speed, and then either throw the whole current into the synchronizing motor or operate jointly both of the motors.

This invention involves several novel and useful features. It will be observed, in the first place, that both motors are run without commutators of any kind, and, secondly, that the speed of the torque motor may be higher than that of the synchronizing motor, as will be the case when it contains a fewer number of poles or sets of poles, so that the motor will be more readily and easily brought up to speed. Thirdly, the synchronizing motor may be constructed so as to have a much more pronounced tendency to synchronism without lessening the facility with which it is started.

In the drawings I have illustrated the invention.

Figure 1 is a part sectional view of the two motors; Fig. 2, an end view of the synchronizing motor; Fig. 3, an end view and part section of the torque or double-circuit motor; Fig. 4, a diagram of the circuit connections employed; and Figs. 5, 6, 7, 8, and 9 are diagrams of modified dispositions of the two motors.

Inasmuch as neither motor is doing any work while the current is acting upon the other, I prefer to rigidly connect the two armatures. I therefore mount both upon the same shaft A, the field-magnets B of the synchronizing and C of the torque motor being secured to the same base D. The preferably larger synchronizing motor has polar projections on its armature, which rotate in very close proximity to the poles of the field, and in other respects it conforms to the conditions, now well understood, that are necessary to secure synchronous action. I prefer, however, to wind the pole-pieces of the armature with closed coils E, as this obviates the employment of sliding contacts. The smaller or torque motor, on the other hand, has, preferably, a cylindrical armature F, without polar projections and wound with closed coils G, as I have described in my previous patents, notably No. 382,279, dated May 1, 1888. The field-coils of the torque motor are connected up in two series H and I, and the alternating current from the generator is directed through or divided between these two circuits in any manner to produce a progression of the poles or points of maximum magnetic effect. I secure this result in a convenient way by connecting the two motor-circuits in derivation with the circuit from the generator, inserting in one motor-circuit a dead resistance and in the other a self-induction coil, by which means a difference in phase between the two divisions of the current is secured. If both motors have the same number of field-poles, the torque motor for a given number of alternations will tend to run at double the speed of the other, for, assuming the connections to be such as to give the best results, its poles are divided into two series and the number of poles is virtually reduced one-half, which being acted upon by the same number of alternations tend to rotate the armature at twice the speed. By this means the main armature is more easily brought to or above the required speed. When the speed necessary for synchronism is imparted to the main motor, the current is shifted from the torque motor into the other.

A convenient arrangement for carrying out this invention is shown in Fig. 4. In said figure J J are the field-coils of the sychronizing, and H I the field-coils of the torque, motor. L L' are the conductors of the main line. One end of, say, coils H is connected to wire L through a self-induction coil M. One end of the other set of coils I is connected to the same wire through a dead resistance N. The opposite ends of these two circuits are connected to the contact m of a switch the handle or lever of which is in connection with the line-wire L'. One end of the field-circuit of the synchronizing motor is connected to the wire L. The other terminates in the switch-contact n. From the diagram it will be readily seen that if the lever P be turned onto contact m the torque motor will start by reason of the difference of phase between the currents in its two energizing-circuits. Then when the desired speed is attained if the lever P be shifted onto contact n the entire current will pass through the field-coils of the synchronizing motor and the other will be doing no work.

The torque motor may be constructed and operated in various ways, many of which I have described in other applications; but I do not deem it necessary in illustration of the principle of construction and mode of operation of my present invention to describe these further herein. It is not necessary that one motor be cut out of circuit while the other is in, for both may be acted upon by the current at the same time, and I have devised various dispositions or arrangements of the two motors for accomplishing this. Some of these arrangements are illustrated in Figs. 5 to 9.

Referring to Fig. 5, let T designate the torque or multiple-circuit motor and S the synchronizing motor, L L' being the line-wires from a source of alternating current. The two circuits of the torque motor of different degrees of self-induction, and designated by N M, are connected in derivation to the wire L. They are then joined and connected to the energizing-circuit of the synchronizing motor, the opposite terminal of which is connected to wire L'. The two motors are thus in series. To start them I short-circuit the synchronizing motor by a switch P', throwing the whole current through the torque motor. Then when the desired speed is reached the switch P' is opened, so that the current passes through both motors. In such an arrangement as this it is obviously desirable for economical and other reasons that a proper relation between the speeds of the two motors should be observed.

Figure 6:
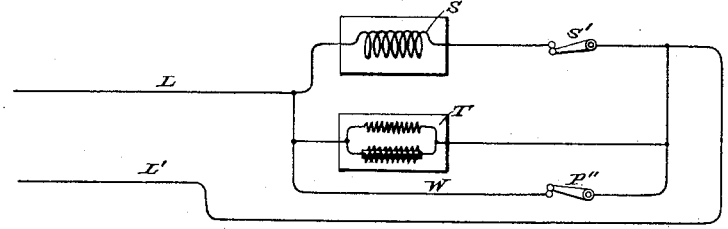

In Fig. 6 another disposition is illustrated. S is the synchronizing motor and T the torque motor, the circuits of both being in parallel. W is a circuit also in derivation to the motor-circuits and containing a switch P''. S' is a switch in the synchronizing-motor circuit. On the start the switch S' is opened, cutting out the motor S. Then P'' is opened, throwing the entire current through the motor T, giving it a very strong torque. When the desired speed is reached, switch S' is closed and the current divides between both motors. By means of switch P'' both motors may be cut out.

Figure 7:
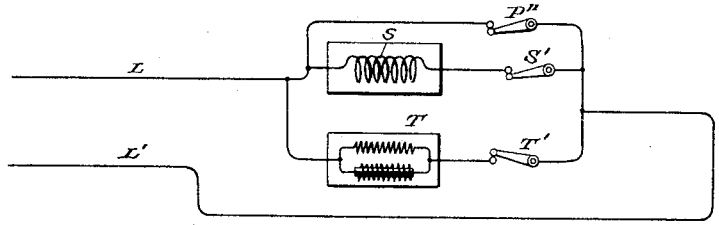

In Fig. 7 the arrangement is substantially the same, except that a switch T'' is placed in the circuit which includes the two circuits of the torque motor.

Figure 8:
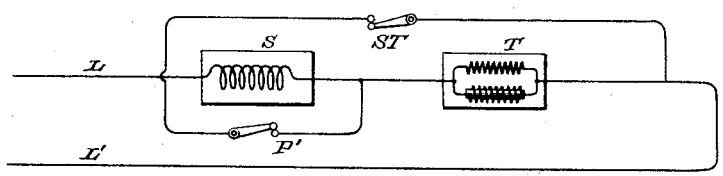

Fig. 8 shows the two motors in series, with a shunt around both containing a switch S T. There is also a shunt around the synchronizing motor S, with a switch P'.

Figure 9:
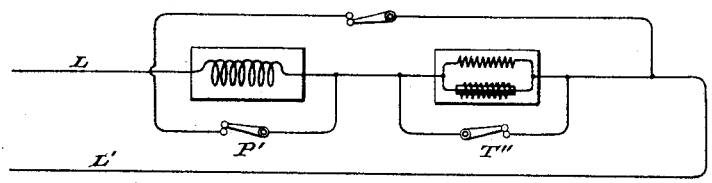

In Fig. 9 the same disposition is shown; but each motor is provided with a shunt, in which are switches P' and T'', as shown.

The manner of operating the systems will be understood from the foregoing descriptions.

I do not claim herein the torque motor nor any part thereof, except in so far as they enter into the combination which forms the subject of this application, for I have made the distinguishing features of said motor the subject of other applications.

What I now claim is—

1. An alternating-current non-synchronizing electric motor coupled with a synchronizing alternating-current motor, substantially as set forth, whereby the former starts the latter and throws it into synchronism with its actuating-current, and switch mechanism for directing the current through either or both of the motors, as set forth.

2. The combination of two motors the armatures of which are mounted upon the same shaft, one of said motors being an alternating-current torque motor, or one in which the magnetic points or poles are progressively shifted by the action of the energizing-current, the other motor being an alternating-current synchronizing motor, and switch mechanism for directing the current through either or both of said motors, as set forth.

3. The combination, with an alternating-current synchronizing motor having one energizing-field, of an alternating-current torque motor having a plurality of energizing-circuits and adapted to be operated by currents differing in phase, and a switch for directing the alternating current or currents through the several circuits of one motor or the single circuit of the other, as and for the purpose set forth.

4. The combination, with an alternating-current motor having field-cores wound with coils adapted to be connected to a source of alternating currents and an armature wound with induced coils closed upon themselves, of a starting device for bringing said motor into synchronism with the generator with which it is connected.

5. The combination, with an alternating-current motor composed of a multipolar alternating field-magnet, and an armature having poles wound with coils closed upon themselves, of a starting device, as set forth.

6. In an alternating-current motor, the combination of a field-magnet having poles wound with coils adapted when connected with a source of alternating current to produce simultaneously opposite magnetic polarities and an armature provided with poles or projections and wound with coils connected in a continuously-closed unconnected circuit, as set forth.

7. The herein-described method of operating alternating-current motors, which consists in actuating a motor by an alternating current to bring a second alternating-current motor up to synchronizing speed relative to the actuating-current and then switching the synchronizing motor into circuit.

NIKOLA TESLA.

Witnesses:
GEORGE N. MONRO,
EDWARD T. EVANS.